United States Patent
Bleakley

[11] Patent Number: 5,830,364
[45] Date of Patent: *Nov. 3, 1998

[54] PROCESS FOR THE TREATMENT OF WASTE MATERIAL SUSPENSIONS

[75] Inventor: Ian Stuart Bleakley, Cornwall, United Kingdom

[73] Assignee: ECC International Limited, United Kingdom

[ * ] Notice: The term of this patent shall not extend beyond the expiration date of Pat. No. 5,558,782.

[21] Appl. No.: 800,849

[22] Filed: Feb. 14, 1997

Related U.S. Application Data

[63] Continuation-in-part of Ser. No. 521,010, Aug. 30, 1995, abandoned, and Ser. No. 715,832, Sep. 19, 1996, Pat. No. 5,733,461, which is a continuation-in-part of Ser. No. 355, 038, Dec. 13, 1994, Pat. No. 5,558,782, said Ser. No. 521,010, is a continuation of Ser. No. 171,018, Dec. 21, 1993, abandoned.

[30] Foreign Application Priority Data

Dec. 23, 1992 [EP] European Pat. Off. .............. 92311774

[51] Int. Cl.⁶ ...................................................... C02F 1/52
[52] U.S. Cl. ........................... 210/712; 162/29; 162/189; 210/717; 210/726; 210/928
[58] Field of Search ..................... 162/189, 190, 162/29; 210/702, 710, 711, 712, 716, 717, 724, 726, 737, 917, 928

[56] References Cited

U.S. PATENT DOCUMENTS

| | | | |
|---|---|---|---|
| 2,470,577 | 5/1949 | Roderick et al. ........................ | 106/306 |
| 2,941,942 | 6/1960 | Dahlstrom et al. ...................... | 210/725 |
| 3,152,001 | 10/1964 | Podschus et al. ........................ | 106/306 |
| 3,262,877 | 7/1966 | Le Compte .............................. | 210/712 |
| 3,639,206 | 2/1972 | Spruill ...................................... | 162/29 |
| 3,736,254 | 5/1973 | Croom .................................... | 210/928 |
| 3,833,463 | 9/1974 | Croom .................................... | 162/189 |
| 4,017,391 | 4/1977 | Black ...................................... | 210/705 |
| 4,076,620 | 2/1978 | Opferkuch et al. ...................... | 210/711 |
| 4,115,188 | 9/1978 | O'Brien et al. .......................... | 162/190 |
| 5,082,887 | 1/1992 | Brown et al. ............................ | 524/413 |
| 5,262,006 | 11/1993 | Andersson et al. ...................... | 162/189 |
| 5,558,782 | 9/1996 | Bleakley et al. ......................... | 210/712 |

FOREIGN PATENT DOCUMENTS

| | | |
|---|---|---|
| 604095 | 6/1994 | European Pat. Off. . |
| 49-127466 | 4/1973 | Japan . |
| 48-37041 | 11/1973 | Japan . |
| 52-3509 | 1/1977 | Japan . |
| 54-353421 | 11/1979 | Japan . |
| 62-162098 | 7/1987 | Japan . |
| 62-60150 | 12/1987 | Japan . |
| 2013169 | 8/1979 | United Kingdom . |
| 2019370 | 10/1979 | United Kingdom . |
| 2265916 | 4/1993 | United Kingdom . |
| WO 79/00870 | 11/1979 | WIPO . |
| WO 87/00544 | 1/1987 | WIPO . |
| WO 88/02048 | 3/1988 | WIPO . |
| WO 90/09483 | 8/1990 | WIPO . |
| WO 96/28517 | 9/1996 | WIPO . |

OTHER PUBLICATIONS

Murray, H.H. (ed.), 1966, TAPPI Monograph Series No. 30 "Paper Coating Pigments", pp. 34–35.

*Primary Examiner*—Peter A. Hruskoci
*Attorney, Agent, or Firm*—Klauber & Jackson

[57] ABSTRACT

A method for recovery and use of a particulate waste material, i.e. inorganic and/or organic solid fines, present in an aqueous suspension, comprising the steps of:
  a) treating the aqueous suspension so as to precipitate, in the presence of the solid fines, crystals of an alkaline earth metal carbonate whereby the solid fines become entrained by and bonded to the crystals, thereby forming in the aqueous suspension a mixed aggregated particulate solid comprising the crystals and the fines; and
  b) recovering the mixed aggregated particulate solid and supplying such solid for use as a filler or pigment in a filler- or pigment-containing composition.

18 Claims, 1 Drawing Sheet

PROCESS FOR THE TREATMENT OF WASTE MATERIAL SUSPENSIONS

CROSS-REFERENCE TO RELATED APPLICATIONS

This application is a continuation-in-part of application Ser. No. 08/521,010 filed Aug. 30, 1995 now abandoned as a continuation of application Ser. No. 08/171,018 filed Dec. 21, 1993 now abandoned; and application Ser. No. 08/715,832 filed Sep. 19, 1996 now U.S. Pat. No. 5,733,461 as a continuation-in-part of application Ser. No. 08/355,038 filed Dec. 13, 1994 issued as U.S. Pat. No. 5,558,782 on Sep. 24, 1996, and as a continuation-in-part of said application Ser. No. 08/521,010.

BACKGROUND OF THE INVENTION

1. Field of the Invention

The present invention relates to the treatment of aqueous suspensions of solid material which comprise wastes or process streams from industrial processes such as waste waters from paper making, wet-mineral refining and the like wherein the solids suspended in the waste waters are generally fine and usually difficult to separate from the water by conventional procedures. Additionally, the present invention relates to the recovery of useful solids-containing products produced by the process.

Many naturally occurring mineral materials are subjected to particle size separations in order to select those particles which have the most desirable distribution of sizes for a particular application. In many cases the natural mineral material contains a significant proportion of particles which are undesirable for the particular application for which the mineral material is being prepared, and it is necessary to remove these excessively fine particles. When the particle size separation is performed on a mineral material in suspension in a liquid, which would most commonly be water, and when the undesired fine particles have an equivalent spherical diameter of about 0.5 $\mu$m or less, the suspension of the undesired fine particles is often recovered in the form of a dilute suspension which is extremely difficult to dewater by conventional methods. It is generally unacceptable, for environmental reasons, to allow such dilute suspensions of fine mineral particles to be discharged to rivers or lakes, and, as a result, such unwanted suspensions of very fine particles are often retained in lagoons, thus occupying large areas of land which could more profitably be used for other purposes.

Similarly, aqueous wastes which contain fine organic materials may also be unsuitable for discharge into environmental waters. For example, waste streams produced by paper mills generally comprise suspensions of fine organic microfibers and other organic materials usually in association with inorganic particulate materials and the solids in such streams are difficult to dewater and the streams are environmentally undesirable to discharge. Other organic particles known to be included in aqueous wastes especially from paper making or from wastes from paper making processes include ink particles, latex particles and resin particles, eg. urea-formaldehyde, which may be bound to inorganic particles. Aqueous wastes from paper mills generally comprise solids which are so-called "fines" which may be organic or inorganic in nature (usually both) and which are defined in TAPPI Standard No. T261 cm-90 "Fines fraction of paper stock by wet screening" (1990). That document describes a method for measuring the fines content of paper making stock and specifies that fines are those particles which will pass through a round hole of diameter 76 $\mu$m. In this definition "particles" includes minute materials of all types including inorganic particles and organic microfibres and particles.

Chemical treatments are known and used to aid the fines recovery in waste waters from processes such as paper making and are aimed at aggregating the fines to larger particles by polymers to improve filtration or sedimentation, or at modifying the surface of the solid particles by surfactants in order to improve the flotation process. Further chemical treatment may be used to aid the water removal in pressing the solids and again polymers are typically used in this task. In general, the solids collected in this way are not re-used.

The present invention, as described hereinafter, is concerned with forming an inorganic precipitate in an aqueous medium containing suspended fine solids and thereby forming a useful aggregate product with the fines which can be re-used for example in paper making. Such a process is not suggested in the prior art.

2. Summary of the Prior Art

A chemical process for dealing with the solid material in a paper plant effluent stream is described by O'Brien in U.S. Pat. No. 4,115,188. The solids present are coagulated and flocculated by changes in pH.

Formation of a precipitate in a waste aqueous medium is known per se. For example, such a process is described by Le Compte in U.S. Pat. No. 3,262,877, Spruill in U.S. Pat. No. 3,639,206 and Opferkuch in U.S. Pat. No. 4,076,620 but in these cases there is no disclosure or suggestion of precipitating specifically onto suspended fines and making use in paper making or other processes of the aggregate formed. It is to be noted that Spruill uses lime to provide a flocculating effect on suspended solid material in an effluent stream from the pulping of wood. However, the suspended lime-treated solid material is separated by a clarification step. Although precipitation is subsequently carried out using addition of carbon dioxide the treated aqueous medium contains substantially no suspended solids when the precipitate is formed. Thus, no aggregate is formed as in the method of the present invention. The waste water which is produced in the various stages of the process described by Spruill is not suitable for treatment to recover a useful aggregate product therefrom because it is too dilute.

In certain known paper making processes wherein a pulp of cellulose fibres, which are essentially large fibres having an average length of several millimeters, is to be formed into a paper product it is known to treat the pulp fibres to render them more suitable for use in the process as follows.

Andersson in U.S. Pat. No. 5,262,006 describes precipitation onto fibres in a fibre pulp stock containing substantial amounts of gypsum which is relatively soluble. In this case, the product is intended to be used in a paper making process. However, the process is directed at the treatment only of certain kinds of pulp compositions which are not waste suspensions of the kind being treated by the present invention and treatment of aqueous media containing predominantly fines is not suggested or disclosed in the reference.

Hokuetsu JP 60-297382 describes precipitation onto raw cellulose fibres to improve the adherence of filler particles onto the fibres for use in paper making. The use of precipitation to treat an aqueous suspension in which the solids are primarily fine rather than large raw fibres which are not waste is not disclosed or suggested by Hokuetsu.

SUMMARY OF THE PRESENT INVENTION

The problem of recovering fines in an aqueous waste or other stream is solved in accordance with the present invention by forming a useful precipitate which bonds to and entrains the fines in an aggregate structure. The resultant aggregate may thereafter be supplied to a paper making or other process for use therein.

The present invention is directed to a method for recovery and use of a particulate waste material present in an aqueous suspension. The waste material will comprise inorganic and/or organic solid fines constituting at least about 0.5% by weight of the suspension. The method comprises the steps of:

a) treating the aqueous suspension so as to precipitate, in the presence of the solid fines, crystals of an alkaline earth metal carbonate whereby the solid fines become entrained by, and bonded to, the crystals, thereby forming in the aqueous suspension a mixed aggregated particulate solid comprising the crystals and the fines; and b) recovering the mixed aggregated particulate solid and supplying such solid for use as a particulate filler or pigment material in a filler- or pigment-containing composition.

The solids contained in the aqueous suspension to be treated in step a) may be formed of at least 95% by weight, desirably about 100% by weight, of particles which are fines. At least 95% by weight of the fines may be substantially insoluble in water.

Desirably, the solids content of the aqueous suspension to be treated in step a) comprises less than 10%, eg. from 1% to 5% especially from 2% to 3% by weight of the suspension. The solids content may increase to from 2% to 20% by weight after formation of the precipitate. The weight ratio of fines originally present to precipitate crystals formed by the method may be in the range of from about 1:3 to about 3:1, eg. about 1:1.

The said mixed aggregated particulate solid present in the said suspension after completion of the precipitation step a) may comprise at least 95% by weight preferably substantially all of the solids present in the suspension.

Desirably, no separation of solid particulate material from the aqueous suspension occurs during or between application of the reagents applied to form the said precipitate. In other words, the concentration of suspended fine solids (excluding formed precipitate) remains the same during addition of the first and second reagents applied to produce the precipitate. As described below, the first and second reagents may be respectively calcium oxide or hydroxide and carbon dioxide.

DESCRIPTION OF THE PRESENT INVENTION

The method according to the present invention may be applied to treat aqueous suspensions of particulate material which comprises "fines" as defined hereinbefore as suspensions of fines produced by industrial processes as aforesaid.

The fines present in the aqueous suspension to be treated may comprise a particulate inorganic material such as a mineral material comprising or derived from one of the mineral materials used or to be used as particulate fillers, extenders, pigments and the like, eg. of the known kinds as described hereinafter.

The fines when present as inorganic particulate inorganic material may comprise particles having an average size less than about 50 $\mu$m, in many cases less than 5 $\mu$m. The particles may be finely divided, i.e. they may generally have an average particle diameter smaller than 2 $\mu$m, desirably smaller than 1 $\mu$m, and in some cases smaller than about 0.5 $\mu$m.

The aqueous suspension of particulate inorganic material may be pre-treated prior to the precipitation step(a) as described above to render the suspension suitable for treatment. For example, the suspension may be concentrated or diluted as described hereinafter or the particulate material may be subjected to a processing step, eg. treatment by a surface treatment agent in a known way to give a surface chemical and/or physical functionality.

The solid material in the aqueous suspension to be treated may alternatively, or in addition to an inorganic component, comprise an organic waste component comprising "fines" as aforesaid, for example waste organic particles, eg. ink, latex or resin particles or microfibres (eg. cellulosic fibres) which typically have a length no greater than 75 $\mu$m. All of these materials may comprise wastes from a paper making plant. When the particulate waste material comprises a combination of a particulate inorganic material and an organic waste component such as waste organic microfibres (typical of a paper mill waste), the inorganic component will usually make up at least 5% by weight of the total waste material; in some circumstances, the inorganic component may comprise as little as 2% or in other circumstances as much as 85% by weight of the total solids of the waste material.

The present invention is particularly suited to the treatment of an aqueous waste suspension containing solid fines which may contain organic solids particles and fibers as described hereinbefore and/or particulate mineral material. The particulate mineral material may comprise material which has been utilized as an inorganic filler, eg. calcium carbonate, calcium sulphate, mica, talc, titanium dioxide or a finely divided kandite clay mineral such as kaolin, a smectite clay such as bentonite, montmorillonite, saponite, hectorite or beidellite, a calcined clay. The waste stream may for example comprise a paper mill effluent (which is normally a mixture of cellulose fibres and inorganic fillers). The invention is also suited to the treatment of aqueous mineral fines-containing suspensions produced by mineral processing operations. For example, the suspension may comprise slime produced as a by-product of the beneficiation of phosphate rock such as apatite or of the extraction of diamonds from clay materials of the kimberlite type; such ore enrichment slimes include an inorganic component and occasionally will include also an organic component. The suspension may alternatively be obtained from a plant for processing kaolin or other fine particulate mineral and may comprise a separated particulate fraction which may normally be considered too fine to process further. When the particulate material is an industrial product of one of these types which is finely divided, for example having an average particle diameter smaller than 2 $\mu$m, and typically smaller than about 1 $\mu$m, and which exists as an aqueous suspension containing not more than about 10% by dry weight of solids, the method according to the first aspect of the present invention is particularly advantageous because suspensions of these fine materials are very difficult to dewater. An aqueous suspension of the aggregated product resulting from the method of the present invention is relatively easy to dewater as illustrated hereinafter.

The method of the present invention could also be used in the treatment of an organic waste suspension which is difficult to dewater by other methods and which would yield a useful product when co-aggregated with a precipitated alkaline earth metal carbonate.

The particles of the particulate material in the treated aqueous suspension may have on their surface a polymeric material such as a dispersing agent present in a trace amount which was added in a previous separation step. This would normally have the effect of making a suspension of the particulate material harder to dewater and so the present invention, therefore, applied to treat such particles is especially beneficial.

Use of the present invention to treat a fines-containing aqueous suspension eg. obtained from an industrial process or as a by-product or waste from an industrial process therefore shows several important advantages as follows over the prior art processes in which fines are collected by the use of chemicals.

Firstly, the use of expensive chemicals can be avoided.

Secondly, the fines-containing water can if required be more efficiently and fully clarified making the clarified water more suitable for re-cycle and re-use.

The following additional advantages are shown over the prior art processes in which precipitation is carried out to treat aqueous wastes or by-products.

Thirdly, the loss of useful fines can be reduced or eliminated by recovering the fines more efficiently and fully.

Fourthly, the fines-containing material which is recovered does not have to be discarded. It can be used in various applications in which alkaline earth carbonates, eg. precipitated calcium carbonate "pcc", are known to be useful per se. For example, the aggregated precipitate and fines can be used in paper making, eg. as a particulate filler either alone or blended with other conventional filler additives, and may beneficially be used in the paper making process in the paper mill which discharged the aqueous waste treated by the method according to the invention. The aggregated material may alternatively be used in the other applications described hereinafter.

Fifthly, where the aggregated precipitate and fines is used as a filler in paper making, by addition to cellulose fibres it provides various benefits as demonstrated herein including better retention than the fines per se with cellulose fibres when the fibres are being formed into sheets and also better light scattering than the fibres per se. The aggregated precipitate and fines can also provide improved reduction of bursting strength (caused by addition of filler) and opacity in a paper making composition.

The form of crystals produced in the precipitation process in the method according to the present invention is not critical to achieve these improvements. In general a mixture of known forms will be produced. However, it may be, desirable to precipitate in a known way crystals of a selected form, eg. aragonite or scalenohedral crystals where the precipitate is a pcc.

The aqueous suspension of the aggregate of precipitate and fines formed in the method of the present invention may be treated so as to separate partially or fully the aqueous host medium from the aggregate solids using one or more separation processes which may be known processes. For example, processes such as filtration, sedimentation, centrifugation or evaporation may be used. The separated aqueous medium, eg. water, may, optionally with further purification or clarification by one or more chemical, biochemical or mechanical processes which may be known per se, be recycled for reuse, eg. in a paper mill, eg. for use in diluting the paper making stock or for use as showers for washing machinery.

The separated solids may be assessed for quality control by measurements taken on samples and subsequently delivered to a storage tank and thereafter supplied as necessary for use in a user application, eg. for use as a filler or pigment for making paper making or paper coating products, eg. in the paper mill in which the method according to the present invention is being applied or alternatively as a filler for other known particulate filler or extender and/or reinforcing applications, ie. in polymer, paint, resin, cement, concrete compositions and the like. The solids containing suspension may if required be re-diluted for use at the user plant.

It is not necessary for the aqueous suspension containing an aggregate of precipitate and fines formed by the method according to the present invention to be dewatered prior to supply for use in a user application, eg. re-use in the paper mill. The aqueous suspension or slurry may be delivered to a storage tank or directly to the user plant without substantial dewatering.

Where the product comprising an aggregate of precipitate crystals and fines is to be re-used as a filler in a paper making composition, eg. in the mill which discharged the waste treated by the method according to the present invention, the product may be supplied to the mill in one of various concentrations in water. The concentration may range from dilute suspension form to dry particulate solids. The product after formation in the method according to the present invention may or may not be treated as appropriate, eg. by dewatering or not, so that it may be delivered to the user plant, eg. paper making mill in the required concentration.

The extent of dilution or concentration of the form in which the product is added to a paper making composition does not critically affect the properties of the resulting paper sheet. It may, however, for economic and practical reasons be more suitable to supply the product in the form of a concentrated pumpable aqueous slurry whose concentration is limited only by the rheological behaviour of the slurry, ie. its pumpability. Where the product is supplied for use in a process at another location it may be preferable to dry the product prior to transport. Where the product has been concentrated or dried prior to delivery and subsequently re-dispersed in or diluted with clean water prior to re-use, the concentration and dilution steps do not materially affect the usefulness of the product.

In any event, as will be clearly evident to those familiar with the paper making art, the product may be blended in various proportions with conventional filler materials, eg. precipitated or natural, eg. ground, calcium carbonate, kaolin and other clay minerals, metakaolin, talc, calcium sulphate etc., the ingredients and composition as well as the host fibres being selected according to the quality of paper required to be produced. In general, these materials are likely to be in slurry form when they are mixed.

The paper maker will normally select the concentration of the aggregate material (produced in accordance with the present invention) in aqueous suspension and the delivery rate of the suspension at the point of addition to the paper making composition, eg. finish. As noted above, this may require re-dilution of a suspension which has been delivered to the paper mill in concentrated form. Generally, the suspension added may contribute aggregate material which forms up to 30% by weight of the solids content of the paper making composition. Where other fillers, eg. conventional inorganic particulate material such as one or more of kaolin, metakaolin, calcium sulphate, mica, talc, titanium dioxide and ground or precipitated calcium carbonate, also form part of the filler content of the paper making composition a total filler composition of up to 30% by weight of the solids content of the paper composition may be employed.

Where the aqueous suspension to be treated contains less than the appropriate level of solids, ie. less than 0.5% by weight, it may be concentrated in a known way, eg. using dissolved air flotation or centrifugation or other known processes. Similarly, the stream if concentrated initially may be diluted, eg. to a 2% solids level, if required, using clean water.

The treated suspension containing the aggregated precipitate of alkaline earth metal carbonate and entrained fine particulate material (or the separated solid material itself) may, as noted above, be reused, eg. by recycling to supplement the filler being used in the sheet forming process in a paper sheet forming mill or to form a paper coating composition. Alternatively, or in addition, water separated from the suspension containing the precipitate of alkaline earth metal carbonate and entrained fine particulate material may be reused in the sheet forming mill.

In the method of the present invention, the alkaline earth metal carbonate precipitate may be formed by introducing into the suspension constituting the used water to be treated a source of alkaline earth metal ions and a source of carbonate ions. Preferably this is carried out in a reaction vessel into which water from the stream to be treated, optionally after concentration or dilution as appropriate, is introduced. This will form the desired precipitate of alkaline earth metal carbonate in situ which will entrain the fine particles in the used water. The first reagent which is added is preferably uniformly distributed throughout the aqueous suspension to avoid local concentration gradients. When the first reagent is sparingly soluble, as is the case with calcium hydroxide, thorough mixing is desirable. It is also desirable that the suspension should be agitated whilst the second reagent is added in order to ensure that the precipitate crystals are formed in an even distribution.

It is preferred to add the source of alkaline earth metal ions followed by the source of carbonate ions; desirably addition of the source of carbonate ions is continued until the pH of the suspension remains at a value in the range 7 to 9. A mixed aggregate product which gives good light scattering properties may be made in this way as exemplified hereinafter.

The conditions under which the alkaline earth carbonate crystals are precipitated may be chosen to give a preferred crystal form as described hereinbefore. The temperature of the treated aqueous suspension may, for example, be selected to be in a preferred temperature range, eg. 35° C. to 55° C., within the general temperature range 10° C. to 80° C.

The source of alkaline earth metal ions is conveniently the alkaline earth metal hydroxide (known as milk of lime when the alkaline earth metal is calcium), but it may alternatively be a water-soluble alkaline earth metal salt, for example the chloride or nitrate. The alkaline earth metal hydroxide may be added to the aqueous suspension already prepared, or may alternatively be prepared in situ, for example by slaking an alkaline earth metal oxide (e.g. quicklime, when an aqueous suspension of calcium hydroxide is desired) in the suspension.

The source of carbonate ions is conveniently carbon dioxide gas which is introduced into the suspension containing the particulate material and the source of alkaline earth metal ions. The carbon dioxide gas may be substantially pure as supplied in gas cylinders or may be present in a mixture of gases such as flue gases. Alternatively, the source of carbonate ions may be an alkali metal or ammonium carbonate. Sodium carbonate is especially preferred on account of its relative cheapness and availability.

When the process of the present invention is used for the treatment of a suspension of an organic waste, for example for the treatment of waste water from a paper mill, in which the suspended solid material consists predominantly of cellulosic fibres, the source of alkaline earth metal ions may be introduced into the suspension, either by slaking an alkaline earth metal oxide, for example calcium oxide or quicklime, in the suspension, or by adding to the suspension a separately prepared suspension of an alkaline earth metal hydroxide.

Whether the alkaline earth metal oxide is slaked in waste water or in fresh water, the water may be at a temperature in the range 10° C. to 80° C., eg. a temperature in the range from 40° C. to 50° C., and the suspension of the alkaline earth metal oxide in the water is preferably agitated vigorously for a time of up to 30 minutes to ensure that the slaking is complete. The suspension may optionally be cooled after slaking.

The quantity of the source of alkaline earth metal ions and the source of carbonate ions used is preferably such as to precipitate sufficient alkaline earth metal carbonate to increase the dry solids content of the aqueous suspension to within the range from 10% to 20% by weight. The weight ratio of fine mineral to alkaline earth metal carbonate (preferably calcium carbonate) will depend upon the nature of the fine mineral. For example bentonite may need at least 80% by weight of the mixture to be alkaline earth metal carbonate, while, in the case of fine kaolinite, only about 25% by weight of the mixture may need to be alkaline earth metal carbonate to give acceptable dewatering.

The suspension containing the precipitate of alkaline earth metal carbonate (preferably calcium carbonate) and entrained particulate material (e.g. an industrial by-product) may be added directly in its relatively dilute form to a paper making composition to provide filler particles for the paper making fibres. Alternatively the suspension may be dewatered by any conventional method, for example by pressure filtration or in a centrifuge.

If desired, a reducing or oxidising bleaching agent may be added to the suspension containing the particulate material or by-product in order to improve its whiteness. The reducing bleaching agent may be, for example, a dithionite salt, such as sodium or zinc dithionite, or zinc dust and sulphur dioxide. The amount of the reducing bleaching agent used is preferably in the range from 1.5 to 7.5 grams of the reducing bleaching agent per kilogram of dry particulate material. The bleaching agent could be added after the addition of the first reagent, but before addition of the second reagent.

The suspension of the precipitate of alkaline earth metal carbonate and entrained particulate material is found to be very much easier to dewater than the original suspension of the particulate material alone, because, when a cake of the mixed solid material is formed by filtration or by centrifuging, the packing of the particles is such that the cake is very much more permeable to water than is a cake of the particulate material by-product alone. Also the mixed solid material is found to give advantageous light scattering properties when used as a paper filler material or as a paper coating pigment.

According to a second aspect of the present invention there is provided a composite mineral pigment/filler comprising aggregates consisting essentially of precipitated alkaline earth metal carbonate (preferably calcium carbonate) and a particulate material, the particles of which are entrained in the alkaline earth carbonate precipitate. Such aggregates can be used in the preparation of a paper-making composition or a paper-coating composition. A paper making composition will contain, in aqueous suspension, and in addition to the aggregated filler of the invention (and optionally other filler materials), cellulosic fibres and other conventional additives known in the art. A typical paper making composition would contain up to about 67% by weight of dry filler material, based on the dry weight of the paper making fibres, and may also contain a cationic or an anionic retention aid in an amount in the range from 0.1 to 2% by weight, based on the dry weight of the filler material. It may also contain a sizing agent which may be, for example, a long chain alkylketene dimer, a wax emulsion or a succinic acid derivative. The composition may also contain dye and/or an optical brightening agent. A paper coating composition will contain, in aqueous suspension, and in addition to the aggregated pigment of the invention (and optionally other filler materials), an adhesive. The formula of the paper coating composition will depend upon the purpose for which the coated paper is to be used, i.e. either for offset or gravure printing. Generally speaking, the amount of adhesive will be in the range from 3 to 35% by weight of adhesive solids, based on the dry weight of the coating pigment. There will also be present from 0.01 to 0.5% by weight, based on the dry weight of the coating pigment, of a dispersing agent. Sufficient alkali will generally be added to raise the pH to about 8–9. The adhesive solids may be a starch, a water dispersible synthetic resin or latex such as a styrene butadiene copolymer, a polyvinyl alcohol an acrylic polymer, polyvinyl acetate, a butadiene-acrylonitrile copolymer, a cellulose derivative such as methyl cellulose, sodium carboxymethyl cellulose or hydroxyethyl cellulose or a proteinaceous material such as casein, animal glue or a vegetable protein.

The invention will now be illustrated by reference to the following Examples.

EXAMPLE 1

Quicklime (252 g) was added to 4,500 cm$^3$ of an aqueous suspension at a temperature of 50° C. containing 7.5% by weight of kaolin clay particles of average particle size 0.22 $\mu$m. The suspension was stirred vigorously for 25 minutes to ensure adequate slaking of the quicklime. The pH of the suspension was then found to be 12.5.

There was then introduced into the suspension of clay particles and calcium hydroxide a gas mixture containing 25% by volume of carbon dioxide at a rate of 5,242 cm$^3$.min$^{-1}$, which corresponds to 0.013 moles of carbon dioxide per minute per mole of calcium hydroxide. The gas mixture was introduced into the suspension as a fine stream of bubbles and vigorous stirring was maintained throughout the introduction.

The pH of the suspension was continuously monitored and the introduction of the gas mixture was continued until the pH of the suspension had fallen to below 8.0.

Figure 1:
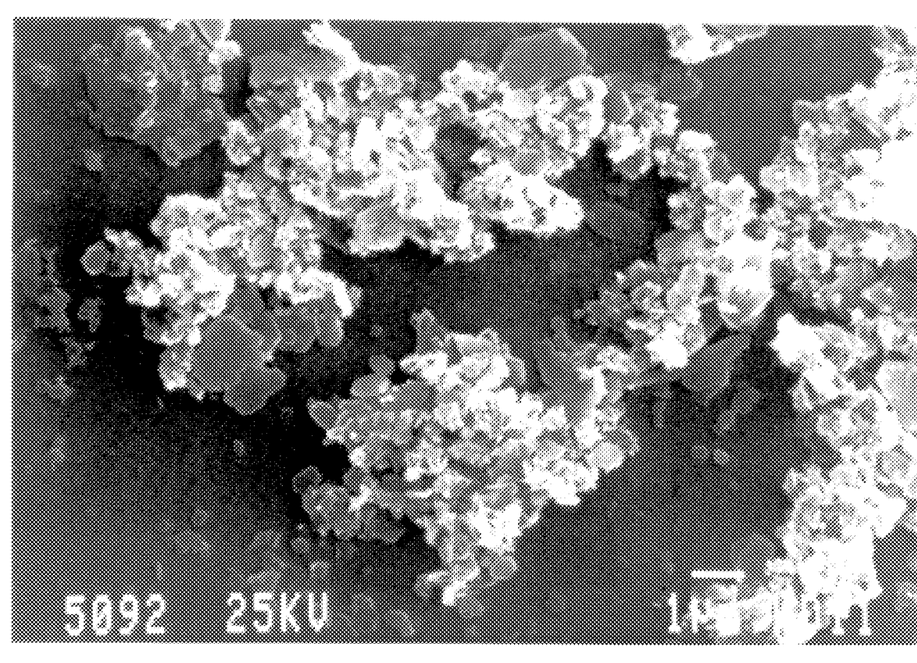
FIG. 1 is a photomicrograph of the aggregate produced in Example 1.

The particulate component of the resultant suspension which contained 54% by weight of calcium carbonate was examined by means of an electron microscope and was found to comprise a co-aggregated mixed mineral (see FIG. 1 in which the platy particles are the kaolinite and the white "fluffy" particles are the precipitated calcium carbonate).

EXAMPLE 2

The experiment described in Example 1 was repeated several times there being added in each case to the suspension of kaolin clay particles a different amount of the quicklime such that the composition of the mixed mineral produced varied in the range from 35% to 73% by weight of calcium carbonate. As a control, a further suspension was prepared by slaking 252 g of quicklime in 4,500 cm$^3$ of water which was free of kaolin particles. In each case there was introduced into the suspension 0.013 moles of carbon dioxide per minute per mole of calcium hydroxide.

The suspension of the mixed mineral produced in each case was filtered and the cake of mixed mineral was remixed with water to form a suspension containing 30% by weight of dry mixed mineral, which suspension was used to measure the Kubelka-Munk scattering coefficient, S, by the following method:

A sheet of synthetic plastics paper material, sold by Arjo Wiggins Appleton plc under the Registered Trade Mark "SYNTEAPE", was cut into a number of pieces each of size 10 cm×6 cm, and each piece was weighed and tested for percentage reflectance to light of wavelength 457 nm when placed over a black background by means of an "ELREPHO" spectrophotometer to give the background reflectance $R_b$. The preweighed pieces of plastics paper were then coated with different amounts of the suspension of mixed mineral to give coat weights in the range from 5 to 20 g.m$^{-2}$. Each coating was allowed to dry in the air and the area of dry coating on each piece of plastics paper was standardised by placing a circular template over the coating and carefully removing surplus coating which lay outside the periphery of the template. Each piece of plastics paper bearing a coated area was then reweighed, and, from the difference in weight and the dimensions of the coated area, the coat weight X in kg.m$^{-2}$ was calculated.

Each coated area was then tested for reflectance to light of wavelength 457 nm when the piece of plastics paper was placed (a) on a black background ($R_0$); and (b) on a pile of uncoated pieces of the plastics paper ($R_1$). Finally the reflectance to light of wavelength 457 nm was measured for the pile of uncoated pieces alone (r).

From these measurements the reflectance $R_c$ of the coating alone was calculated from the formula:

$$R_c = \frac{R_1 \cdot R_b - R_0 \cdot r}{(R_1 - R_0) \cdot rR_b + Rb - r}$$

and the transmission $T_c$ of the coating from the formula:

$$T_c^2 = \frac{(R_0 - R_c)(1 - R_c R_b)}{R_b}$$

From these two quantities it is possible to calculate a theoretical value for the reflectance $R_{00}$, of a coating layer of infinite thickness of the same material from the formula:

$$\frac{1 - T_c^2 + R_c^2}{R_c} = \frac{1 + R_{00}2}{R_{00}}$$

The Kubelka-Munk scattering coefficient S in m$^2$.kg$^{-1}$ may now be calculated from the formula:

$$SX = \frac{1}{b} \coth^{-1} \cdot \frac{1 - aR_c}{bR_c}$$

where $$a = \frac{1}{2} \left[ \frac{1}{R_{00}} + R_{00} \right]$$

and

-continued $$b = \frac{1}{2}\left[\frac{1}{R_{00}} + R_{00}\right]$$

The scattering coefficient S was plotted against the coat weight X and the value of S in each case for a coat weight of 8 g.m$^{-2}$ was found by interpolation.

The results obtained are set forth in Table 1.

TABLE 1

| weight % calcium carbonate | scattering coefficient S |
|---|---|
| 35 | 227 |
| 54 | 265 |
| 73 | 276 |
| 100 | 253 |

EXAMPLE 3

The experiment described in Example 1 was repeated except that there was added to the suspension of kaolin clay particles, before the quicklime, 1.69 g of sodium educing bleaching agent. The particulate component of the suspension on completion of the treatment with carbon dioxide gas was separated by filtration and dried in an oven for 16 hours at 80° C. The resultant dry cake was pulverised and the reflectances to light of wavelength 457 nm and 570 nm, respectively, were measured by means of an "ELREPHO" spectrophotometer.

The experiment was repeated except that no sodium dithionite was added to the suspension of kaolin clay particles.

The results obtained are set forth in Table 2 below:

TABLE 2

|  | % reflectance to light of wavelength | |
|---|---|---|
|  | 457 nm | 570 nm |
| with sodium dithionate | 89.9 | 94.6 |
| without sodium dithionate | 88.8 | 94.2 |

EXAMPLE 4

The experiment described in Example 1 was repeated several times there being added in each case to the suspension of kaolin clay particles a different amount of the quicklime such that the composition of the mixed mineral produced varied in the range from 0.5% to 99.5% by weight of calcium carbonate. In each case there was introduced into the suspension 0.013 moles of carbon dioxide per minute per mole of calcium hydroxide.

A small sample of the suspension of the mixed mineral produced in each case was poured into a Buchner filter funnel provided with a piece of standard filter paper, the side arm of the filtrate flask being connected to the laboratory vacuum source. The filtrate was collected in a measuring cylinder inside the filtrate flask, and at intervals the volume of filtrate collected and the time which had elapsed since the start of filtration were recorded. The square of the volume collected was plotted graphically against the elapsed time, and a curve was obtained which had a large central straight line portion. The slope of this straight line portion was recorded in each case.

The relationship between the square of the volume of filtrate collected and the elapsed time is given by the Carmen-Kozeny equation:

$$\frac{Q^2}{T} = \frac{2 \cdot A^2 \cdot P \cdot E^3 \cdot (v-1)}{5 \cdot v \cdot S^2 \cdot (1-E^2) \cdot d^2}$$

where:
Q is the volume of filtrate collected;
T is the elapsed filtration time;
A is the area of the filter medium;
P is the differential pressure across the filter medium;
E is the fraction of voidage in the filter cake;
v is the viscosity of the suspending medium;
S is the specific surface area of the particulate phase; and
d is the specific gravity of the particulate phase.

The slope $Q^2/T$ of the straight line portion of the graph plotted for each suspension gave a measure of the filtration rate in each case and, since A, P, v, S and d can be assumed to be constant under the conditions of the experiment, a standardised filtration rate F can be found to be given by:

$$F = \frac{Q^2 \cdot R}{T}$$

where:

$$R = \frac{\frac{1}{d} + \frac{W_c}{S_c}}{\frac{W_s}{S_s} - \frac{W_c}{S_s}}$$

where:
$W_c$ is the weight fraction of water in the cake;
$S_c$ is the weight fraction of solids in the cake;
$W_s$ is the weight fraction of water in the suspension; and
$S_s$ is the weight fraction of solids in the suspension.

Suspensions were also prepared by mixing with 4,500 cm$^3$ of the suspension of fine kaolin clay particles different quantities of precipitated calcium carbonate which had been prepared separately from the kaolin clay suspension by carbonating milk of lime. The filtration rate for each mixed suspension and the percentage by weight of dry material in the cake were measured as described above.

The results obtained are set forth in Table 3 below:

TABLE 3

| % by weight of precipitated calcium carbonate in mixture | Precipitated in situ | | Separately mixed | |
|---|---|---|---|---|
|  | Filtration rate (F.) | % by wt. solids | Filtration rate (F.) | % by wt. solids |
| 0 | 0.001 | 73.8 | 0.001 | 73.8 |
| 35 | 0.380 | 42.7 |  |  |
| 50 |  |  | 0.167 | 55.9 |
| 54 | 1.090 | 38.1 |  |  |
| 100 | 7.880 | 35.4 | 7.880 | 35.4 |

These results show that, for a given percentage by weight of precipitated calcium carbonate in the mixture, a higher filtration rate is obtained if the calcium carbonate is precipitated in the presence of the fine kaolin than if it is precipitated separately and then added to the suspension of fine kaolin.

EXAMPLE 5

Different quantities of quicklime were added to 4,500 cm³ portions of an aqueous suspension at a temperature of 50° C. containing 7.5% by weight of Wyoming sodium bentonite particles of average particle size smaller than 0.1 μm. In each case the suspension was stirred vigorously for 25 minutes to ensure adequate slaking of the quicklime.

There was then introduced into each suspension of bentonite particles and calcium hydroxide a gas mixture containing 25% by volume of carbon dioxide at a rate of 0.013 moles of carbon dioxide per minute per mole of calcium hydroxide. The gas mixture was introduced into the suspension as a fine stream of bubbles and vigorous stirring was maintained throughout the introduction. The pH of the suspension was continuously monitored and the introduction of the gas mixture was continued until the pH of the suspension had fallen to below 8.0.

The filtration rate, F, and the percentage by weight of water retained in the filter cake were measured for each suspension as described in Example 4 above. The results obtained are set forth in Table 4 below:

TABLE 4

| % by wt. of precipitated calcium carbonate in mixture | Filtration rate (F.) | % by wt. solids |
|---|---|---|
| 80 | 0.070 | 43.7 |
| 95 | 1.510 | 41.5 |
| 99 | 2.140 | 44.0 |
| 100 | 7.880 | 35.4 |

These results show that, when the amount of calcium carbonate precipitated in the suspension is about 90% or more of the total weight of dry bentonite and calcium carbonate, the suspension can be dewatered by filtration at a very advantageous rate, but even when the proportion of calcium carbonate in the mixture is 80% by weight, the rate of filtration would be acceptable in a commercial process.

EXAMPLE 6

11.25 g of quicklime was added to 1000 ml of an aqueous suspension containing 180 g of a kaolin clay having a particle size distribution such that 80% by weight consisted of particles having an equivalent spherical diameter smaller than 2 μm. The solids content of the kaolin clay suspension before the addition of the quicklime was 16.2% by weight. The suspension was maintained at a temperature of 50° C. and vigorously stirred for 25 minutes to ensure adequate slaking of the quicklime.

A gas mixture comprising 25% by volume of carbon dioxide was then introduced into the suspension as a fine stream of bubbles at a rate of 0.13 moles of carbon dioxide per minute per mole of calcium hydroxide. The temperature of the suspension was maintained at 45° C. and the gas mixture was introduced with continuous agitation of the suspension until the pH of the suspension had fallen to below 8.0.

The experiment described above was repeated three more times except that 11.25 g of quicklime was added to 1000 ml of an aqueous suspension containing, respectively, 60 g, 20 g and 6.7 g of the kaolin clay. The solids content of the suspension of kaolin clay in each case before the addition of the quicklime was, respectively, 16.2%, 5.8%, 2.0% and 0.7% by weight.

A suspension was also prepared containing 180 g of the kaolin clay alone in 1000 ml of the suspension. A further suspension was prepared by adding quicklime to 1000 ml of water and carbonating the calcium hydroxide thus formed under the conditions described above.

The filtration rate, F, and the percentage by water retained in the filter cake were measured for each suspension as described in Example 4 above. The results obtained are set forth in Table 5 below.

TABLE 5

| % by wt. of precipitated calcium carbonate in mixture | % by wt. of solids in kaolin suspension | Filtration rate (F.) | % by wt. of solids in cake |
|---|---|---|---|
| 0 | 16.2 | 0.06 | 66.9 |
| 10 | 16.2 | 0.21 | 58.1 |
| 25 | 5.8 | 0.61 | 50.1 |
| 50 | 2.0 | 0.93 | 49.4 |
| 75 | 0.7 | 1.38 | 44.7 |
| 100 | 0 | 2.54 | 40.1 |

EXAMPLE 7

Sample of waste water from a paper mill was found to contain 0.27% by weight of suspended solids which were predominantly cellulosic fibres, but also contained a smaller proportion of inorganic filler particles. There were added to three portions of this waste water, each of 1 liter, 14 g, 28 g and 56 g, respectively of quicklime. The mixtures of waste water and quicklime were stirred vigorously at a temperature of 40° C. to complete the slaking of the quicklime.

As gas containing 25% by volume of carbon dioxide, the remainder being air, was admitted into each of the portions of suspension at a rate which was calculated to complete the conversion of all the calcium hydroxide present into calcium carbonate in a time of 75 minutes. In each the temperature of the suspension during carbonation was maintained at 45° C.

Each sample of suspension was filtered and the filtration rate was determined by the method described in Example 4. As a comparison the filtration rate was also determined for a sample of the untreated waste water. The results are set forth in Table 6 below:

TABLE 6

| Volume of quicklime added (ml) | nil | 14 | 28 | 56 |
|---|---|---|---|---|
| Wt. CaCO₃ (g/l) | nil | 25 | 50 | 100 |
| Waste water solids (g/l) | 2.75 | 2.75 | 2.75 | 2.75 |
| % by wt. pptd. CaCO₃ in product | nil | 90.1 | 94.8 | 97.3 |
| CO₂-containing gas rate (ml/m) | — | 300 | 600 | 1200 |
| CO₂ rate (ml/m) | — | 75 | 150 | 300 |
| Filtration rate | 0.0176 | 3.0 | 3.4 | 6.1 |

Each of the three products which contained precipitated calcium carbonate were examined under the scanning electron microscope, and were found to consist of fine scalenohedral precipitated calcium carbonate in conjunction with the particles and fibres which were originally present in the waste water.

EXAMPLE 8

A further sample of waste water from a paper mill was weighed and filtered and the residue dried at 110° C. The solids content of the waste water was found to be 0.3% by weight. The dried residue was heated in a furnace for 1 hour at 1000° C. and the ignited residue was weighed again. The loss in weight on ignition of the dry residue was found to be 89% which was accounted for principally by the cellulosic fibre content of the dry residue. It was known that the inorganic filler used in the paper making process employed by the mill from which the waste water was recovered consisted predominantly of calcium carbonate, and it was therefore assumed that the ignited residue, which accounted for 11% of the weight of the dry residue, was calcium oxide. This corresponded to 19.6% by weight of calcium carbonate, and it was therefore estimated that the approximate composition of the solids component of the waste water was 80% by weight of cellulosic fibres and 20% by weight of calcium carbonate.

A suspension of calcium hydroxide was prepared by slaking 112 g of quicklime in 1 liter of water at 50° C. with vigorous agitation for 25 minutes. Assuming that the quicklime is completely slaked, each liter of suspension prepared in this way will contain 148 g of calcium hydroxide.

There were added to three separate 1 liter portions of the waste water, quantities of the calcium hydroxide suspension which were calculated to give, after carbonation with carbon dioxide-containing gas, precipitates which contained, respectively, 60%, 80% and 90% by weight of precipitated calcium carbonate. The gas contained 25% by volume of carbon dioxide, the remainder being air, and the gas was introduced into the mixture of calcium hydroxide suspension and waste water at a rate such as to complete the precipitation in 5 minutes.

Each of the three portions of treated waste water was filtered and the filtration rate was determined by the method described in Example 4. As a comparison, the filtration rate was also determined for a sample of untreated waste water. The results are set forth in Table 7 below:

TABLE 7

| Volume of $Ca(OH)_2$ added (ml) | nil | 22.3 | 59.8 | 134.0 |
|---|---|---|---|---|
| Wt. of $Ca(OH)_2$ added (g/l) | nil | 3.3 | 8.9 | 19.8 |
| Wt. calcium carbonate (g/l) | nil | 4.5 | 12.0 | 26.8 |
| Waste water solids (g/l) | 3.0 | 3.0 | 3.0 | 3.0 |
| % by wt. pptd. $CaCO_3$ in product | nil | 60 | 80 | 90 |
| $CO_2$-containing gas rate (ml/m) | — | 806 | 2150 | 4836 |
| $CO_2$ rate (ml/m) | — | 202 | 538 | 1209 |
| Filtration rate | 0.0048 | 0.133 | 0.98 | 2.43 |

It can be seen that the filtration rate of the waste water is greatly increased when calcium carbonate is precipitated in the waste water in accordance with the invention.

The filter cake which was obtained by filtering the waste water in which 90% by weight of the solid component consisted of precipitated calcium carbonate was dried and pulverised and the resultant pulverised material used as a filler in a paper making composition.

Hand sheets of paper filled with the composite material prepared as described above were prepared in the following way. 400 g of bleached sulphite spruce pulp were soaked in 10 liters of filtered water for 4 hours and the mixture was then disintegrated for 10 minutes in a turbine mixer, the impeller rotating at a speed of 1500 rpm. The contents of the mixer were washed out with a further 10 liters of water and transferred to a laboratory beater where a further 2 liters of water was added and the mixture beaten for 16½ minutes. At this stage the stock contained approximately 1.8% by weight of dry pulp. The beating time was chosen to give the optimum compromise between brightness and strength properties of the stock which corresponds to a Canadian Standard Freeness of 300. 800 ml of the stock was then made up to 2 liters with water and disintegrated in a laboratory disintegrator which was operated for 15,000 revolutions of the impeller. The volume of stock was made up to 4 liters with filtered water and the consistency was checked by forming a paper sheet from a small sample by draining on a suitable wire screen and drying and weighing the sheet thus formed. Water was added if necessary to reduce the consistency to 0.3% by weight of dry pulp.

The paper making stock thus formed was divided into three portions and a different amount of the pulverised composite filler was added to each portion and stirred in by hand.

Hand sheets were prepared from each of the three portions of filler-containing paper making stock according to the procedure laid down in TAPPI Standard No. T205 om-88, "Forming handsheets for physical tests of pulp". For each hand sheet 400 ml of the stock was poured into the sheet forming machine and surplus water was removed.

The ash, or inorganic material, content of the paper formed from each of the three portions of stock was determined by incinerating a sample of paper formed from the stock according to the procedure laid down in TAPPI Standard No. T413 om-85.

The brightness, or percentage reflectance to violet light of the paper formed from each of the three portions of stock was measured by means of a DATACOLOR 2000 brightness meter fitted with a No. 8 filter (457 nm wavelength).

The opacity of each sample of paper was measured by means of the DATACOLOR 2000 brightness meter fitted with a No. 10 filter (a green filter embracing a broad spectrum of wavelengths). A measurement of the percentage of the incident light reflected was made with a stack of ten sheets of paper over the black cavity ($R_{OO}$). The ten sheets were then replaced with the single sheet from the top of the stack over the black cavity and a further measurement of the percentage reflectance was made (R). The percentage opacity was calculated from the formula:

Percentage opacity=$100.R/R_{OO}$

The procedure was performed a total of ten times with each time a different sheet of paper on the top of the stack, and the average value of the percentage opacity was determined.

The Kubelka-Munk scattering coefficient, S, for each sample of paper was determined by the procedure described in Example 2 except that, in each case, samples of the paper produced in the manner described above were substituted for the pieces of coated synthetic plastics paper material which were referred to there. The measurements were made using the DATACOLOR 2000 brightness meter fitted with a No. 8 filter.

The hand sheets from each batch were also tested for bursting strength by the test prescribed in TAPPI Standard No. T403 om- 85. The bursting strength is defined as the hydrostatic pressure in kilopascals required to produce rupture of the material when the pressure is increased at a controlled constant rate through a rubber diaphragm to a circular area of the paper 30.5 mm in diameter. The area of the material under test is initially flat and held rigidly at the circumference but is free to bulge during the test. Samples of each sheet were also weighed dry, the weight of the dry sample being used to determine the weight per unit area of the paper in grams per square metre. The burst strengths were divided by the weight per unit area of the paper to give a burst ratio.

As a comparison, the experiment described above was repeated, but using as the filler in the paper making composition a proprietary precipitated calcium carbonate product produced by John & E. Sturge Limited under the trade name "CALOPAKE F". The particle size distribution of this material was such that the weight median particle diameter was 3.0 μm. The amounts of this proprietary filler used in each of the three portions of paper making stock were intended to be, as nearly as possible, the same as the amounts of the composite filler used in the three portions of stock in the experiment described above.

As a further comparison, hand sheets were prepared from paper making stock which contained no filler and subjected to the same tests as are described above.

The results are set forth in Table 8 below.

TABLE 8

| Filler | Ash | Reflectance (%) | Opacity (%) | Scattering Coefficient S ($cm^2 \cdot g^{-1}$) | Burst index |
|---|---|---|---|---|---|
| None | 0.7 | 82.2 | 70.2 | 288 | 2.43 |
| CALOPAKE F | 6.2 | 86.4 | 82.0 | 545 | 1.52 |
| | 11.2 | 87.8 | 85.7 | 696 | 1.04 |
| | 17.2 | 89.2 | 88.3 | 866 | 0.60 |
| Composite filler material | 6.6 | 83.1 | 84.3 | 537 | 1.55 |
| | 12.0 | 84.1 | 89.8 | 750 | 0.95 |
| | 16.2 | 84.8 | 92.6 | 917 | 0.60 |

It will be noted that, although the brightness of the filled paper obtained with the composite filler material is slightly poorer than that obtained with the proprietary precipitated calcium carbonate, the opacity and the scattering coefficient are both better in the case of the composite filler material and the burst strength is about the same. The brightness of the composite filler material could be improved by the use of a reducing bleaching agent as described in Example 3 above.

I claim:

1. A method for recovery and use of a particulate material present in an aqueous suspension derived from an industrial waste material, said material comprising inorganic and/or organic solid fines constituting at least 0.5% by weight of the suspension, wherein the inorganic fines have an average size less than about 50 μm and the organic fines have a length such that they will pass through a round hole of diameter 76 μm, comprising the steps of:

a) introducing into the aqueous suspension a reagent comprising a source of alkaline earth metal ions and a reagent comprising a source of carbonate ions so as to precipitate, in the presence of the solid fines, crystals of an alkaline earth metal carbonate whereby the solid fines become entrained by and bonded to the crystals, thereby forming in the aqueous suspension a mixed aggregated particulate solid comprising the crystals and the fines; and b) recovering the mixed aggregated particulate solid; and c) incorporating said solid in a composition which is a paper making composition or a paper coating composition or a paint composition or a polymer or resin composition.

2. A method as claimed in claim 1 wherein the solid fines constitute about 1% to about 5% by weight of the suspension.

3. A method as claimed in claim 2 wherein the solid fines constitute about 2% to about 3% by weight of the suspension.

4. A method as claimed in claim 1 and wherein said reagents are added to the aqueous suspension and no separation of solid fines from the aqueous suspension occurs during the addition of said reagents.

5. A method as claimed in claim 1 and wherein the dry weight ratio of the said solid fines to the said crystals is in the range from about 1:3 to about 3:1.

6. A method as claimed in claim 1 and wherein the solid fines comprise a mixture of inorganic and organic fines.

7. A method as claimed in claim 1 and wherein the solid fines comprise inorganic particles having a diameter less than about 2 μm.

8. A method as claimed in claim 1 and wherein the solid fines comprise organic fibers optionally together with organic particles or inorganic particles or organic and inorganic particles and the solid fines will pass through a round hole of diameter 76 μm.

9. A method as claimed in claim 8 and wherein the organic fibers have a length of no greater than about 75 μm.

10. A method as claimed in claim 1 and wherein the solid fines comprise inorganic particles selected from the group consisting of calcium carbonate, calcium sulfate, kandite clay, smectite clay, calcined clay, mica, talc and titanium dioxide.

11. A method as claimed in claim 1 and wherein the aqueous suspension comprises the effluent from a paper mill or slime produced by an ore treatment process or a by-product of a mineral processing operation.

12. A method as claimed in claim 1 and wherein the alkaline earth metal carbonate comprises a calcium carbonate.

13. A method as claimed in claim 1 and wherein the reagent comprising a source of alkaline earth metal ions comprises an alkaline earth metal hydroxide or a water-soluble alkaline earth metal salt.

14. A method as claimed in claim 1 and wherein the reagent comprising a source of carbonate ions comprises carbon dioxide gas or an alkali metal carbonate or ammonium carbonate.

15. A method as claimed in claim 1 and wherein the reagent comprising a source of alkaline earth metal ions and the reagent comprising the source of carbonate ions are utilized in an amount such as to precipitate the crystals in an amount sufficient to produce the mixed aggregated particulate solid in the aqueous suspension in an amount from 2% to 20% on a dry weight basis.

16. A method as claimed in claim 15 and wherein the mixed aggregated particulate solid is incorporated in a paper making or paper coating composition.

17. A method as claimed in claim 16 and wherein the aqueous suspension containing the mixed aggregated solid is added directly to a filler stream which is utilized in a paper making composition thereby to provide a method for the production and use of a material as a particulate filler or pigment in a paper making or paper coating process further comprising utilizing the aqueous suspension containing the mixed aggregated particulate solid and said filler stream in a paper making or paper coating composition.

18. A method as claimed in claim 17 and wherein the treated suspension comprises the waste water from a paper mill.

* * * * *